Figure 1:
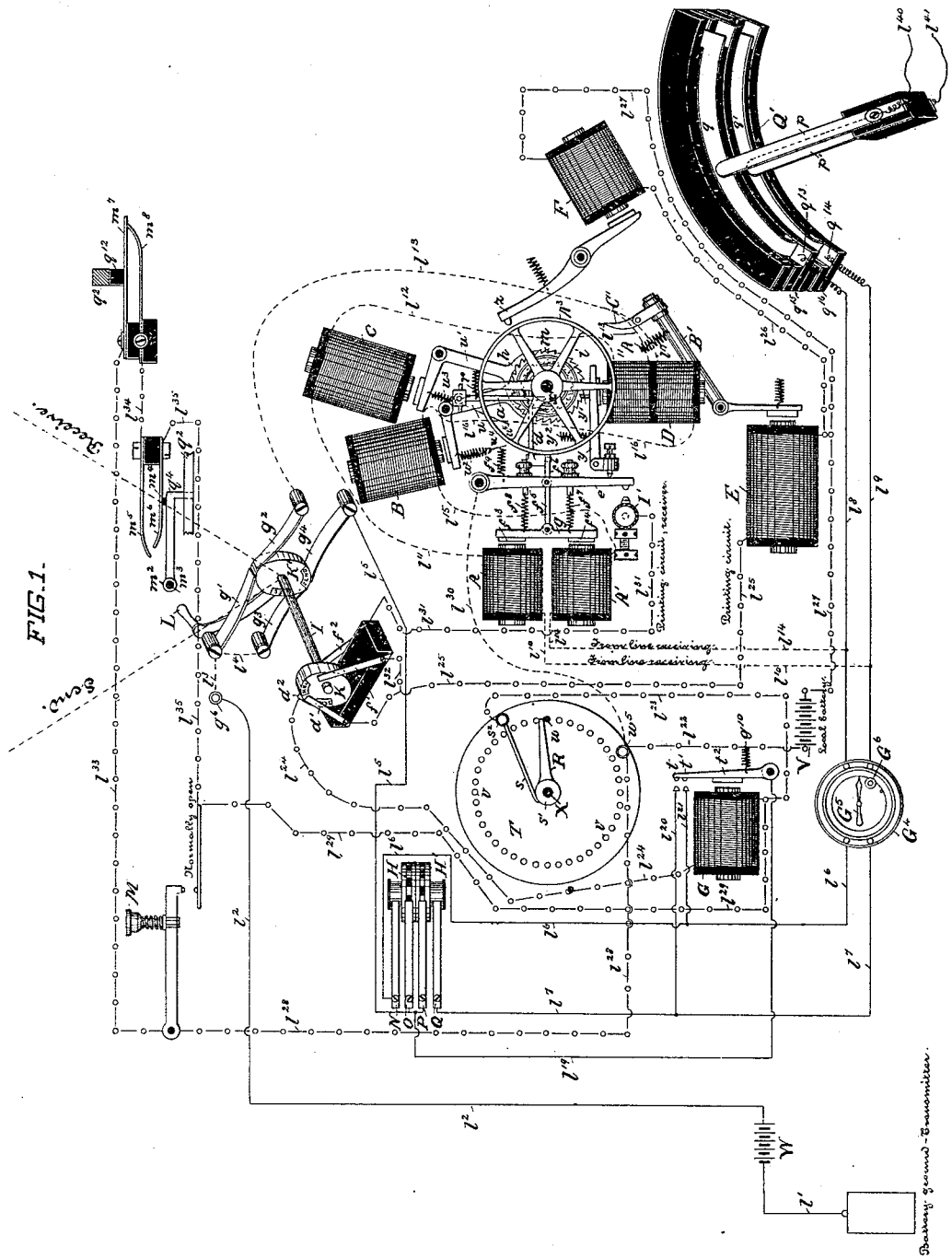
Figure 1A:
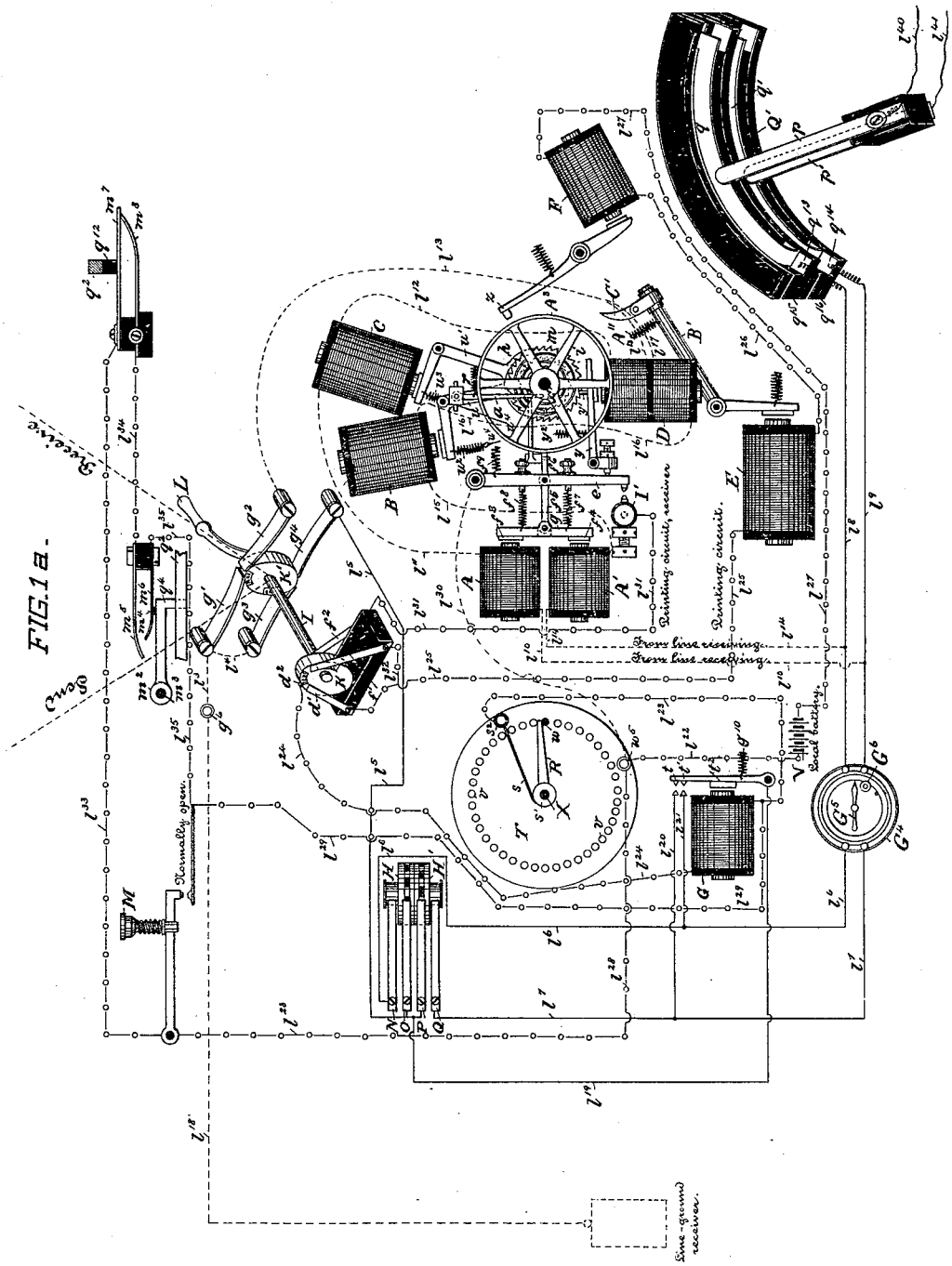

(No Model.) 8 Sheets—Sheet 1.

J. H. LINVILLE.
PRINTING TELEGRAPH.

No. 350,983. Patented Oct. 19, 1886.

WITNESSES:

INVENTOR:

(No Model.)  8 Sheets—Sheet 2.

J. H. LINVILLE.
PRINTING TELEGRAPH.

No. 350,983.  Patented Oct. 19, 1886.

WITNESSES:
Louis H. Kuebler
Hermann Bormann

INVENTOR:
Jacob H. Linville
By Bergner & Douglass
Attys (No Model.) 8 Sheets—Sheet 3.

J. H. LINVILLE.
PRINTING TELEGRAPH.

No. 350,983. Patented Oct. 19, 1886.

WITNESSES:
Henry G. Powell.
Louis H. Kuebler.

INVENTOR:
Jacob H. Linville
By Burgess & Douglass
Attys (No Model.) 8 Sheets—Sheet 4.
J. H. LINVILLE.
PRINTING TELEGRAPH.
No. 350,983. Patented Oct. 19, 1886.
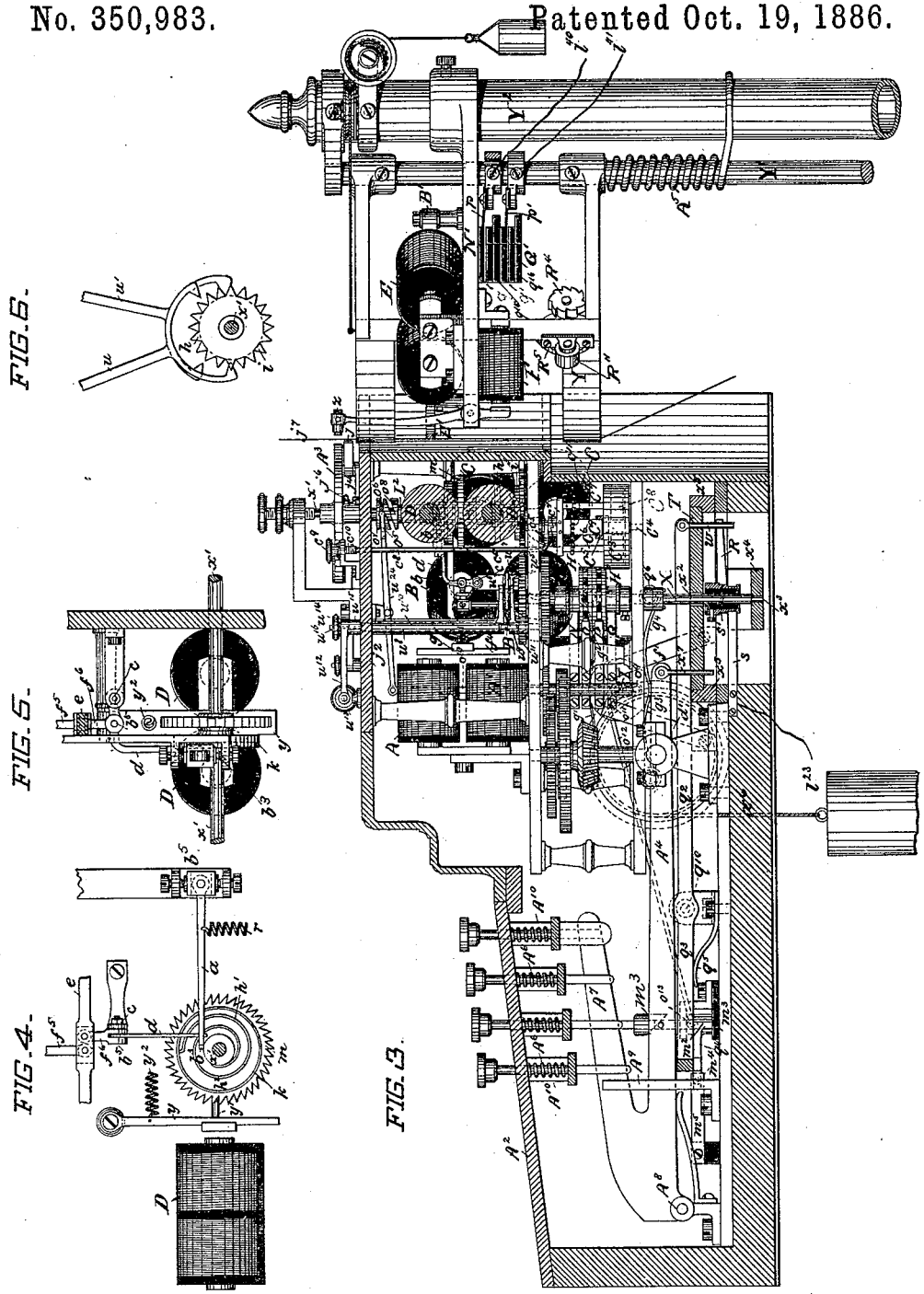
WITNESSES:
Louis H. Kiebler
Hermann Bormann
INVENTOR:
Jacob N. Linville
By Berger & Douglass
Attys

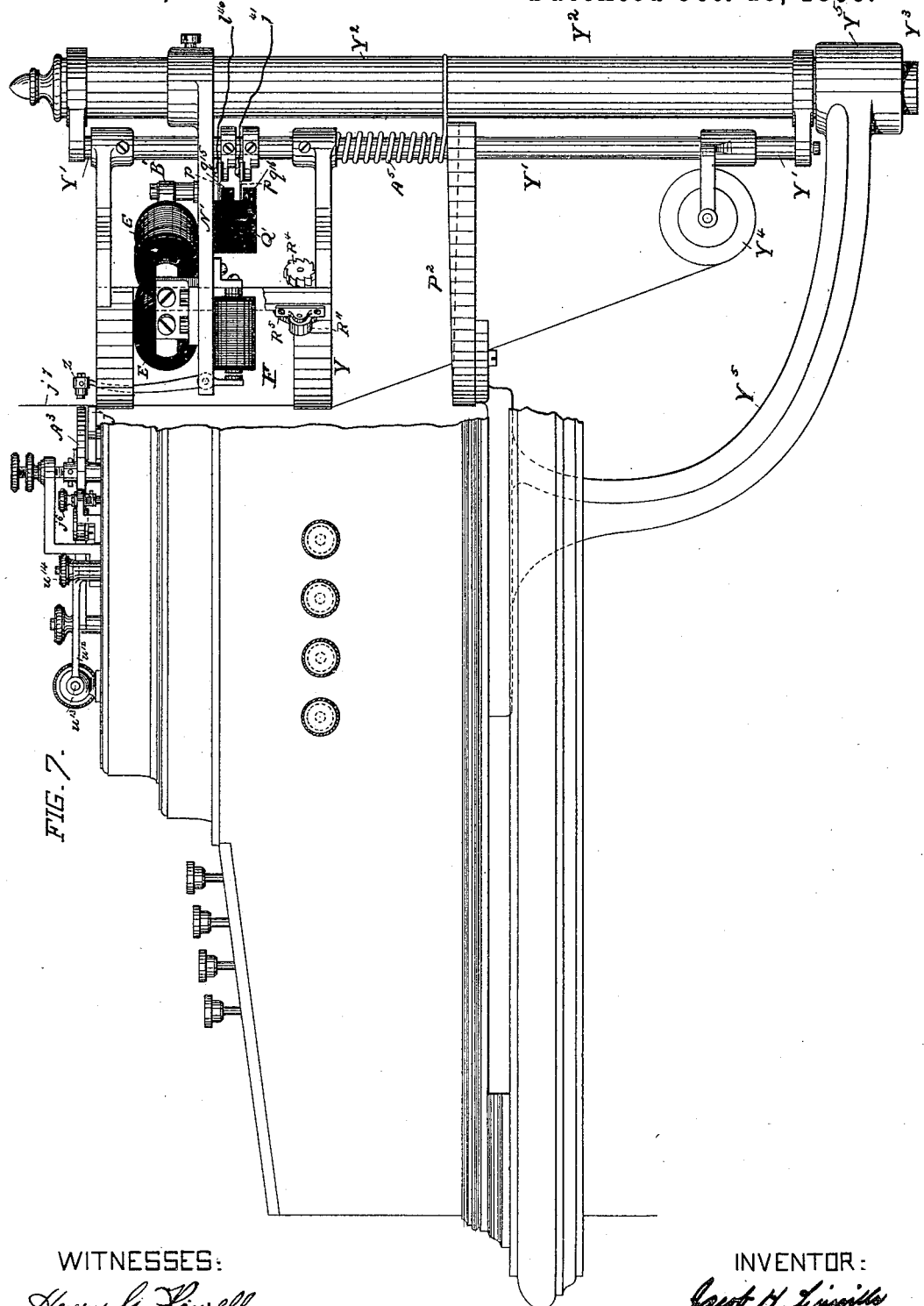

(No Model.) 8 Sheets—Sheet 6.
J. H. LINVILLE.
PRINTING TELEGRAPH.
No. 350,983. Patented Oct. 19, 1886.

WITNESSES:
Henry G. Powell.
Louis H. Kuebler.

INVENTOR:
Jacob H. Linville,
By Berger & Douglass,
Atty's.

(No Model.) 8 Sheets—Sheet 7.

J. H. LINVILLE.
PRINTING TELEGRAPH.

No. 350,983. Patented Oct. 19, 1886.

WITNESSES:
Henry G. Powell.
Louis H. Kuebler.

INVENTOR:
Jacob H. Linville
By Berquer & Douglass
Atty.

(No Model.)  8 Sheets—Sheet 8.

J. H. LINVILLE.
PRINTING TELEGRAPH.

No. 350,983. Patented Oct. 19, 1886.

WITNESSES:
Hermann Bormann
Thos. M. Smith

INVENTOR:
Jacob H. Linville
By Bergen & Douglass
attys.

UNITED STATES PATENT OFFICE.

JACOB H. LINVILLE, OF PHILADELPHIA, PENNSYLVANIA, ASSIGNOR TO THE INTERNATIONAL PRINTING TELEGRAPH COMPANY, OF CAMDEN, N. J.

PRINTING-TELEGRAPH.

SPECIFICATION forming part of Letters Patent No. 350,983, dated October 19, 1886.

Application filed August 24, 1885. Serial No. 175,131. (No model.)

*To all whom it may concern:*

Be it known that I, JACOB H. LINVILLE, of the city and county of Philadelphia, in the State of Pennsylvania, have invented certain new and useful Improvements in Printing-Telegraphs, of which improvements the following is a specification.

My invention relates to a printing telegraph system and apparatus of the class in which rotating type-wheels controlled by escapements are used in connection with impression devices operated by electro-magnetic devices, the object of my invention being to print messages, stock-reports, and other financial or commercial matters with increased rapidity and accuracy in page form, on sheets of paper or upon continuous rolls of paper, in lines, in paragraphs, or in columns—that is to say, printing messages, &c., similar in form and arrangement on the transmitting-instrument simultaneously with their transmission to a receiving-instrument, or printing on instruments which may be combined or which may be made interchangeably to act either as a transmitting-instrument or a receiving-instrument, or on instruments which may be constructed and operated separately or independently of one another.

The change from a transmitting-instrument to a receiving-instrument is readily and effectively accomplished by the simple operation of a switch, as hereinafter more fully explained.

My invention embraces the following important and specific features: first, controlling the motion of the type-wheels by single or multiple double-pallet "dead-beat" or wedge escapements on one type-wheel shaft, with single or double scape-wheels actuated by suitable mechanism or motive power—such as a train of gearing moved by springs or weights or by an electric motor; second, electrical devices and mechanism for closing the printing circuit, consisting of a peculiar and novel construction of a compound relay, with compound armatures linked to a relay-tongue, the armatures vibrating when currents are sent alternately through the respective branches of the magnets, and the relay-tongue operating only when the circuits are closed simultaneously through both magnets; third, devices or mechanism for holding the paper on which impressions are to be made upon a vibrating segmental frame suspended on a vertical shaft secured to a fixed support and vibrating in a circular arc contiguous to the type-wheel, and mechanism for feeding the paper step by step to space horizontally between letters, and line by line to space between lines, through the vibratory movement of the segmental "paper-carrier" in front of the type-wheels on both transmitter and receiver, the impression being produced through the action of a printing-hammer impinging on the side of the paper opposite to the type-wheel; the shaft carrying the reciprocating segmental frame carries also a paper-roller, which is hung in supports secured to this shaft, and swings backward and forward as the paper from the roll in a continuous sheet is vibrated in front of the type-wheel; fourth, automatic mechanism for releasing the vibrating segmental paper-carrier and for returning the paper to the left-hand margin, and mechanism operating automatically for breaking the circuit of the main line and enabling the operator transmitting to ascertain when the paper on the receiving-instrument has reached the margin; fifth, certain improvements in mechanical and electrical devices for detaching the escapements and for changing the circuits to effect the change from a transmitting-instrument to a receiving-instrument, and vice versa; sixth, certain features in the construction and arrangement of a centrifugal adjustable governor for regulating and controlling the speed of the machine and for other purposes, which will be hereinafter more particularly set forth; and, seventh, a unison device, as hereinafter more fully described, operating either separately or in conjunction with a locking device released by a compound or duplex relay that closes the impression and paper-feeding local circuit.

The characters on the type-wheel are indicated on insulated buttons connected with levers extending to a circular indicator-plate which is in electrical connection with a local battery, each lever being provided with a metallic pin normally extending nearly through said plate and guided thereby. Extending under the rear portion of the character-levers is a hinged bow with an arm reaching to a hole in the indicator-plate, and provided at its extremity with a pin of insulating material, called the "unison-pin," which normally extends through the circular plate and arrests a metallic insulated arm out of contact with this plate. This arm may be secured to either the type-wheel shaft or the indicator-shaft, moving in unison with the type-wheel shaft, and must be insulated therefrom and brought into electrical connection with the impression and ratchet magnets of the transmitter by contact with metallic pins. When a character and lever are depressed, this unison-arm is raised and the type-wheel of the transmitter revolves as many divisions as there are intervals between the unison-pin and the character depressed. When the metallic arm on the indicator-shaft strikes the depressed metallic pin, an electric circuit is closed from a local battery through the paper-feeding magnet and the impression-magnet, an impression is instantly made, and the vibrating segmental paper-carrier is immediately thereafter moved the space of one letter by the recoil of the spring attached to the lever of the ratchet magnet, after which the circuit is broken by the withdrawal of the metallic pin in the indicator-plate. The escapement-magnets, as hereinafter more fully explained, being cut out of circuit in the transmitting-instrument when transmitting, they remain inactive. A circuit-breaker connected with the indicator-shaft, or it may be connected with the type-wheel shaft, sends battery-currents of one polarity from a line-battery successively through the respective lines, energizing alternately the respective escapement-magnets of the instrument used as a receiver. At each electrical impulse the type-wheel of the receiving-instrument moves one character, and at each break of the circuit it moves one character, so that twice as many characters can be printed as there are electrical impulses sent over the lines, and the speed of transmission, which is determined by the number of electrical impulses practicable over one line, is increased in proportion to the number of lines and escapements. The scape-wheels, unison-spiral disk-wheel, and serrated wheel are attached to a loose sleeve on the type-wheel shaft, and remain idle while the machine is being used as a transmitting-instrument, but are connected to the type-wheel shaft by a clutch movable on a feather or pin on said shaft when the instrument is used as a receiver, the unison-bow arm being raised and the circuits changed by a suitable switching device, as will hereinafter be more particularly explained.

In the accompanying drawings, forming part hereof, the nature of my invention is fully illustrated, in which—

Figure 2:
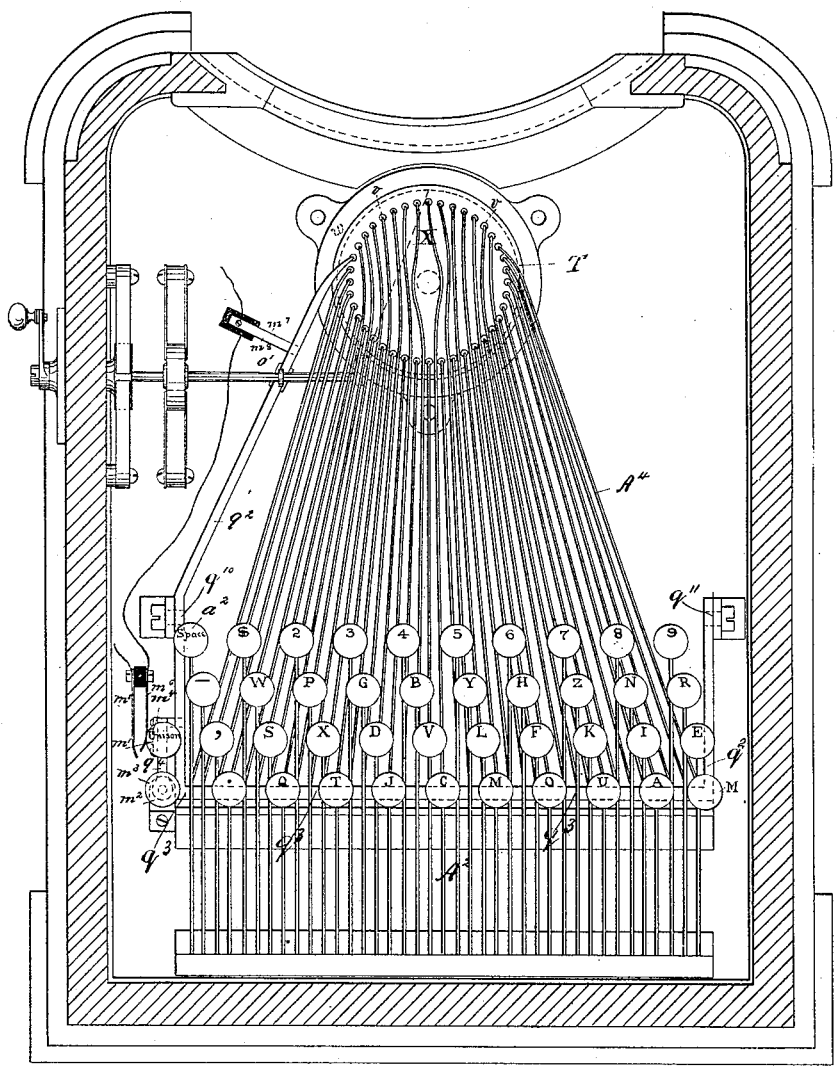
Figure 8:
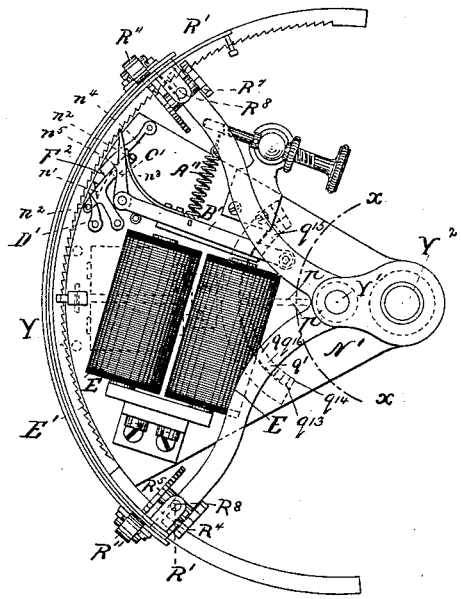
Figure 9:
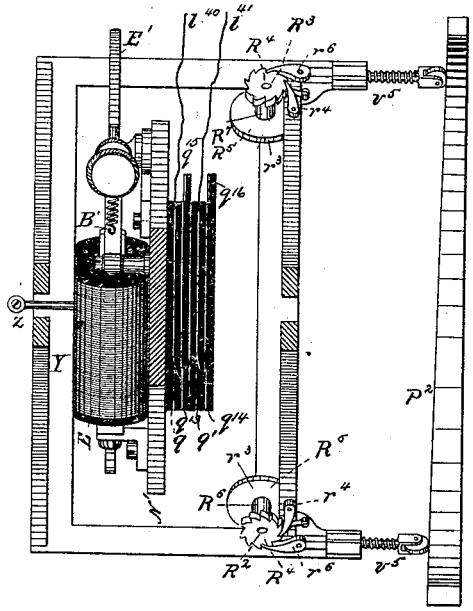
Figure 11:
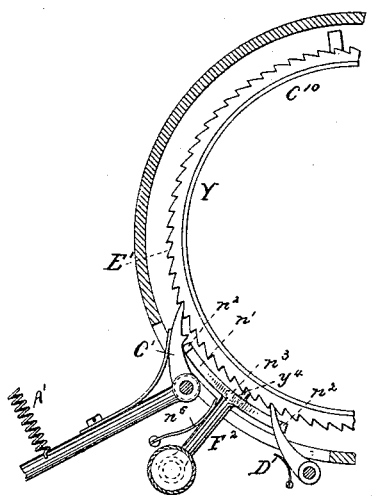
Figure 12:
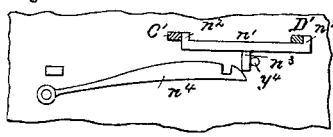
Figure 10:
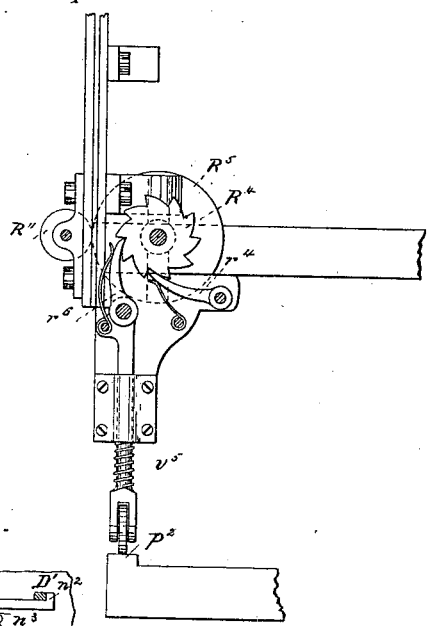
Figure 13:
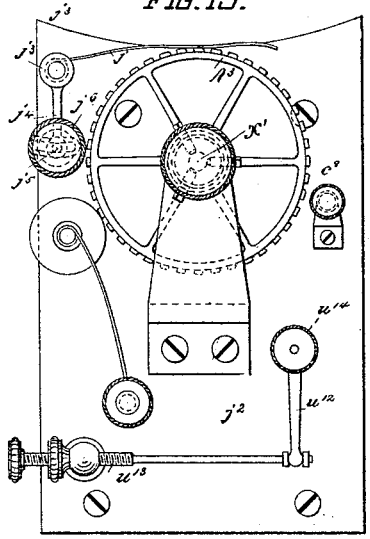
Figure 14:
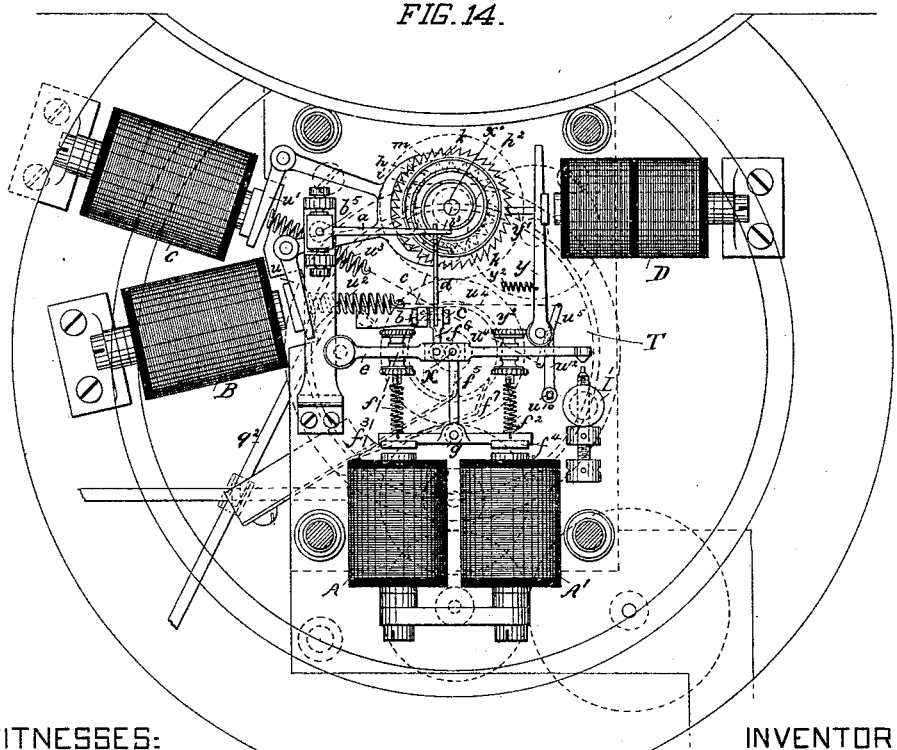
Figure 15:
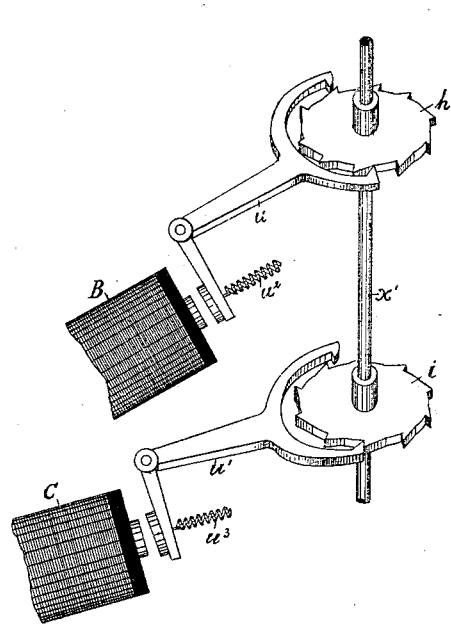
Figure 16:
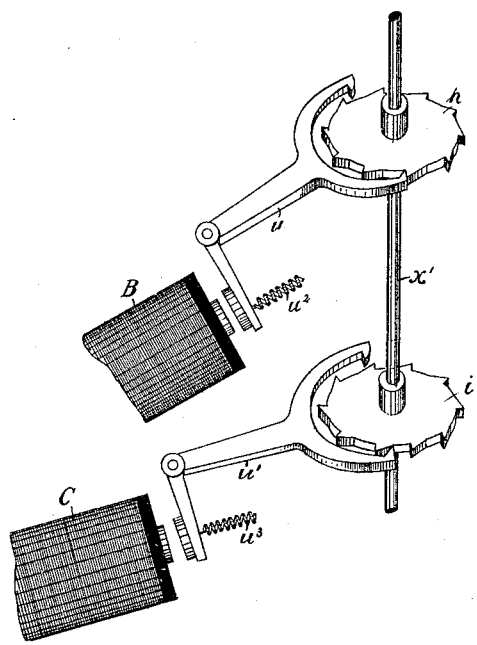
Figure 17:
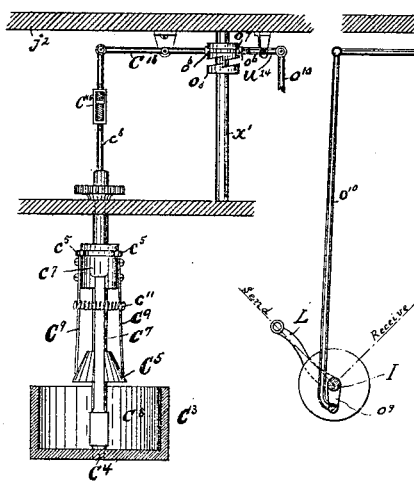
Figure 18:
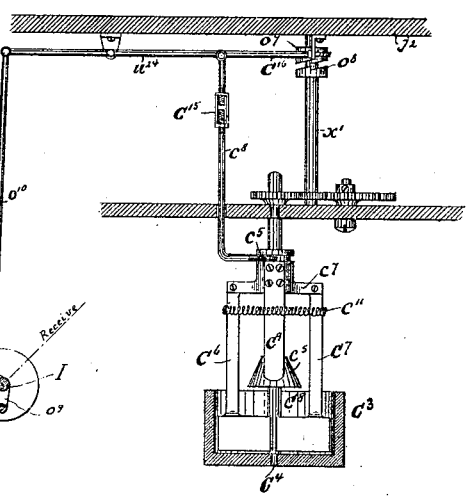

Figure 1 is a diagrammatic view of the principal operative electrical devices or systems of mechanism and circuits in a combined instrument, in connection with line and local batteries, with their circuits arranged for sending pulsations to a distant receiver and for printing on a home-instrument. Fig. 1$^a$ is a diagrammatic view of the principal operative electrical devices or systems of mechanism and circuits in a combined instrument, in connection with line and local batteries, with their circuits and devices arranged to be used as a receiver. Fig. 2 is a plan view showing the transmitting-keys, keys for spacing, for releasing the insulated unison-pin in the indicator-plate, for releasing the bow, and the circuit-changing switch and lever for shifting the clutch for changing the instrument from a transmitter to a receiver. Fig. 3 is a longitudinal section of the operative mechanism embraced in a combined instrument. Fig. 4 is a plan view of the scape-wheels and pallets, spacing-wheel, unison device, and differential electro-magnet. Fig. 5 is a front elevation of the same. Fig. 6 is a plan view of a double escapement with wedge pallets. Fig. 7 is an exterior side elevation of a combined transmitter and receiver, partly in section, showing the paper feeding and releasing mechanism. Fig. 8 is a plan view of the vibrating segmental paper-carrier, with the cams, dogs, and automatic tripping devices operated from the inside of the cylinder. Fig. 9 is an elevation from the inside of the vibrating segmental paper-carrier beyond the dotted line $xx$ of Fig. 8, showing the incline plane of circular segment and concentric with the paper-carrier, the circuit-breaking springs and ratchet, and paper-feeding wheels. Fig. 10 is a detailed view of the vertical feeding ratchets and dogs. Fig. 11 is a plan view of the vibrating segmental paper-carrier and automatic tripping devices operated from the outside of said vibrating segmental paper-carrier. Fig. 12 is a detailed view of the automatic tripping device. Fig. 13 is a view of the top plate of the machine, showing the type-wheel, adjusting-screws, printing-spring, and inking-roller. Fig. 14 is a plan view showing the several magnets and operative devices for controlling the type-wheels and for effecting unison. Figs. 15 and 16 represent, respectively, perspective views of two scape-wheels secured to the same shaft, with their levers, pallets, armatures, and magnets, when both circuits are interrupted, and showing the teeth on the respective scape-wheels alternating with one another; and Figs. 17 and 18 are respectively front and side elevations of the centrifugal adjustable governor, showing the connection of the adjusting rods and levers to the commutator-shaft.

In order that the description and operation of the respective instruments may be fully appreciated, I will now describe, by reference to the drawings, the principal elements and features of a combined instrument, and of the method of operating it as a transmitter and for simultaneously actuating a similar instrument organized as a receiver. The apparatus is constructed on a metallic base, $x^6$, preferably inclosed in a case, on which is fitted a metallic key-board, A$^2$, and a metallic cover-plate having in it a large circular aperture, as shown in Fig. 14, and covered by a removable circular cap fitting around a fixed top frame-plate, as shown in Fig. 13, all of which may be readily removed without disturbing the key-levers and frame-work containing the gearing, electro-magnets, adjustments, and the operative parts of the instrument. The paper carrying and feeding devices are supported outside of this case on a bracket, $Y^5$, firmly secured to the bed-plate $x^6$. On the key-board $A^2$ are placed character-buttons of insulating material, preferably made of ivory, and attached to stems projecting downward and moving freely through the key-board, which stems are supported in suitable guide-plates, $A^{10}$, between which guide-plates and key-board are coiled around the respective stems helical springs $A^6$, while stop-pins pass through the stems to limit their upward movement produced by the action of the helical springs. The lower ends of the character-key stems are bifurcated and embrace loosely the upper portion of the parallel projecting arms $A^7$ of the key-levers $A^4$, the lower arms of which are hinged at their rear ends at $A^8$, and are parallel until they pass through a guide-plate, $A^9$, in the rear of the first row of stems, and behind the hinged unison-bow $q^3$, from which point they converge to a series of holes, $v$, in the circular metallic indicator-plate T, fitting into a recessed plate, $x^5$, secured to the bed-plate $x^6$. Passing transversely under the key-levers in the rear of the first row of keys is the unison-bow $q^3$, hinged at $q^{10}$ and $q^{11}$, one portion of which bow $q^3$ extends forward over the indicator-plate T, and is so arranged that the depression of any character-key lever will depress the rear portion of the unison-bow and elevate the forward part thereof, which is called the "unison-bow arm," $q^2$, withdrawing the "insulated unison-pin" $w$, attached thereto, from contact with the revolving arm R. Under each key-lever $A^4$ is a spring, which raises the forward end of the key-lever when released, and permits the rear portion of the unison-bow $q^3$ to rise under the action of a suitable spring, $q^5$, beneath the same, thus causing the unison-bow arm $q^2$ to fall and project the insulated unison-pin $w$, through the indicator-plate T, into the path of the revolving arm R. On the character-buttons are engraved letters, figures, punctuation-marks, &c., with a key, $a^2$, for spacing between words, a unison-key, $m'$, for depressing the rear portion of the unison-bow $q^3$, thereby withdrawing the insulated unison-pin $w$ on the unison-bow arm $q^2$ without depressing a key-lever and character-button, a key, M, for closing a branch circuit to revolve the vibrating segmental frame Y, and a key, $m^2$, for releasing a locking-lever passing under the unison-bow $q^3$ and closing a local branch circuit by causing a contact to be made between the springs $m^5$ and $m^6$, as shown in Figs. 1 and $1^a$. There are as many key-levers, less one, as there are letters, characters, and spaces on the type-wheel, a blank space on the type-wheel corresponding with the key for spacing between words, and another blank corresponding with the insulated unison-pin $w$. The indicator-plate T is embedded in the fixed plate $x^5$, which has a circular opening extending outside of the circle of holes $v$ in the indicator-plate T. The bed-plate and the bottom of the case have also openings similar in diameter to the openings in the fixed plate $x^5$. The holes $v$ in the indicator-plate T are uniformly spaced, and in number equal to the divisions on the type-wheel. At the extremity of each of the key-levers $A^4$ is pivoted a metallic pin, $x^7$, which enters one of the holes $v$, and is normally held therein by its lever without projecting beyond the lower surface of the indicator-plate T, while the insulated unison-pin $w$ normally projects below the under surface of this plate; but when, by the manipulation of the keys and levers, the unison-bow arm $q^2$ is raised and the insulated unison-pin $w$ is withdrawn by the depression of a character-key, its metallic pin $x^7$ is projected below the indicator-plate T, while the reverse action of the respective pins $x^7$ and $w$ occurs when any character-key and lever are released. The shaft X, geared to the type-wheel shaft $x'$ by wheels of similar diameter and moving synchronously therewith, passes through the indicator-plate T, the lower portion of which shaft is detachable at $q^6$, and is supported in a bearing, $x^2$, on the indicator-plate T, and by a bearing, $x^3$, in the step $x^4$, secured to the bed-plate $x^6$. The type-wheel shaft $x'$, as shown in Fig. 3, may be so arranged as to perform the functions of this shaft, which indicator-shaft X is only employed as a substitute for the shaft $x'$, to avoid crowding of the surrounding parts and mechanism. On this shaft X is fixed a metallic arm, R, insulated therefrom, and on the hub of the arm R bears a circuit-spring, $s$, insulated from the indicator-plate T and bed-plate $x^6$, and from the metallic portions of the instrument. The arm R normally rests against the insulated unison-pin $w$, and is only stopped in electrical contact with any metallic pin $x^7$ when this metallic pin is depressed, thereby arresting the type-wheel $A^3$ of the transmitter, and causing it to present to the printing-hammer the letter or character indicated by the button depressed on the key-board.

Motion is communicated to the horizontal shaft of the driving-train by a weight, or it may be by a spring or suitable motor, which by bevel and intermediate gearing, as shown in Fig. 3, communicates motion to the shafts X and $x'$, which must move synchronously, or otherwise the circuit-breakers H H' and arm R must be placed on the type-wheel shaft to insure correspondence between the pin-holes in the indicator-plate T and the contacts and insulations on the circuit-breakers H H', and also the divisions on the type-wheel. The circuit-breakers H H' are insulated from this shaft $x'$ and from each other, and each consists of a metallic hub on which is mounted a toothed disk of metal with insulating-disks on each side, the number of metallic teeth for electrical contact with the circuit-springs and the number of insulations on each circuit-breaker being equal, respectively, to one-fourth the number of divisions on the type-wheel $A^3$, the contacts and insulations alternating on the two circuit-breakers with the insulations so extended that a make and break of the circuit of one line must occur before the consecutive make and break of the other line. The insulated circuit-springs O P connect the main-line battery W with the peripheral contacts, which are in electrical connection with their respective metallic hubs, and the insulated springs N Q conduct the current from the hubs to the lines $l^6$ $l^7$, resulting in "sending" alternate pulsations of the same polarity through the main-line conductors when the shaft X and the type-wheel shaft $x'$ revolve. The centrifugal adjustable governor $C^3$ is driven by a pinion on its shaft $C^4$, geared to the type-wheel shaft $x'$, and is the last member in the train of gearing. Its construction and operation are such as to facilitate the starting of the train, to regulate its speed, and to prevent the recoil of the type-wheel when the arm R on the indicator-shaft X is stopped by a metallic pin, $x^7$. The cross-arm $c^7$ of the governor is loose on its shaft $C^4$, and is adjusted to the same by an adjustable spring, $C^9$, bearing against the side of a conical hub, $C^5$, secured to its shaft $C^4$. The cross-arm $c^7$ of the governor has a grooved hub, which is supported by a forked arm, $c^5$, attached to a rod, $c^8$, which extends through the top plate, $j^2$, of the instrument, and is adjustable by a milled nut turning in the screw $c^{10}$. The weighted arms $C^6$ $C^7$, when rotated, diverge in consequence of the centrifugal force developed, and press against the interior of the circular rim of the cup $C^8$, their bearing-surface being covered with leather or ivory, or any other suitable material, to regulate the friction. A delicate helical spring, $c^{11}$, surrounds the arms $C^6$ $C^7$, to prevent their too sudden divergence in starting the apparatus. The adhesion of the governor to the shaft $C^4$ is entirely determined by the pressure of the spring $C^9$ against the conical hub $C^5$, aided, preferably, by a corresponding spring on the diametrically-opposite side of the conical hub. This pressure is adjustable by screws passing through the spring into the arm $c^7$, and also by raising the governor by the screws $c^{10}$, which permit this spring $C^9$ to bear on a portion of the conical hub $C^5$, having a reduced diameter.

The vertical adjusting-rod $c^8$, instead of being adjusted by a screw, can be adjusted by a swivel-nut, $c^{15}$, introduced into and coupling with the same, and a tilting lever, $c^{16}$, may be supported at its center to the top plate, $j^2$, and pivoted at one end to the lever $u^{24}$, and at the other end to the vertical rod $c^8$, so that when the clutch $o^7$ is lowered the governor will be raised, thereby automatically reducing the retarding effect of the governor upon the instrument used as a receiver. The governor, being thus adjustable and having only a frictional connection with its shaft, moves ahead slightly when the type-wheel is arrested, preventing the recoil of the type-wheel, and upon starting the train the frictional contact between the spring $C^9$ and the conical hub $C^5$ permits a slight movement of the shaft $C^4$ before overcoming the inertia of the governor, and thus facilitating the starting of the type-wheel. The forward pull of the governor when slipping by its frictional connection, after the type-wheel has been arrested, effectually prevents backlash of the type-wheel, and holds it firmly while the printing-hammer is compressing the paper.

To render the instruments interchangeable as transmitting and receiving instruments, the scape-wheels $h$ and $i$, the serrated wheel $m$, with a number of indentations on the periphery equal to the divisions on the type-wheel, and the unison-spiral $k$, with its spiral groove $h^2$ and spiral projection $h'$, are rigidly secured to a sleeve, $L^2$, movable on the type-wheel shaft $x'$, and having at its upper end a clutch, $o^8$, with which the clutch $o^7$, sliding on the shaft $x'$ and secured thereto by a feather, is made to engage when the instrument is changed from a transmitter to a receiver. When transmitting, the sleeve $L^2$ is released from its clutch $o^7$, and consequently the wheels connected to the same are inactive.

A "unison locking-latch," $a$, as shown in Figs. 4 and 5, is pivoted in the rocking bar $b^5$, which permits vertical and lateral motion of the latch $a$. This unison locking-latch $a$ is solicited downward and toward the type-wheel shaft $x'$ by a spring, $r$, placed at a suitable angle to the latch $a$. On the end of the unison locking-latch $a$ is a pin, $b^3$, which rides in the spiral groove $h^2$ until, by slightly more than one revolution of the shaft $x'$, it is carried by the spiral to the termination of this groove $h^2$ near the periphery of the disk-wheel $k$, thus preventing further motion of the shaft $x'$ and the type-wheel $A^3$, and locking the type-wheel $A^3$ of a receiver at unison corresponding with the unison position of the type-wheel $A^3$ of a transmitter when arrested by the pin $w$. The bent lever $d$ is pivoted at $b$ and $c$, and its horizontal arm passes under the unison locking-latch $a$. This bent lever $d$ is linked to the tongue $e$ of the compound relay A A' by the link $f^6$, in order that the movement of the tongue $e$, when attracted through its attachment by the link $f^5$ to the bar $g$, carrying the armatures $f^3$ and $f^4$, will cause an upward movement of the bent lever-arm $d$ and release the unison locking-latch $a$, whereupon the latch $a$ is thrown toward the type-wheel shaft $x'$ by the spring $r$, and must commence again its excursion toward the terminal of the spiral groove near the periphery of the disk-wheel $k$. The electro-magnets B and C, when energized by electrical impulses alternately passing through their helices, alternately attract their armatures and operate the escapement-levers $u$ and $u'$, which are alternately withdrawn on the break of the circuit by the helical springs $u^2$ and $u^3$. Each lever $u$ and $u'$ carries double pallets, the pallets on the lever $u$ engaging in teeth on the anchor scape wheel $h$, and the pallets on the lever $u'$ engaging in teeth on the scape-wheel $i$. These scape-wheels $h$ and $i$ have one-fourth as many teeth as there are divisions on the type wheel $A^3$, and they are placed on the sleeve $L^2$ in such relative position that the teeth of one of the scape wheels are midway between and alternate with the teeth of the other scape-wheel. Each move of either the lever $u$ or $u'$ permits a rotatory movement of the type-wheel equal to the space between the centers of two letters. When the armature of the electro-magnet C is attracted, as shown in Figs. 1 and 1ª, one pallet of the lever $u'$ engages in the scape-wheel $i$, and when it is released the scape-wheel $h$ is arrested by the pallet of the quiescent lever $u$ of the electro-magnet B, and the type-wheel is arrested at the next letter. The electro-magnet B is next vitalized, releasing one pallet on the lever $u$ from the teeth in the scape-wheel $h$ after allowing motion equivalent to another division of the type-wheel, and when the circuit is interrupted through the electro-magnet B the pallet on the lever $u'$ of the electro-magnet C is in position to arrest the scape-wheel $i$ after the type-wheel has moved another division, a pallet of a quiescent lever belonging to the electro-magnet previously energized always being in position to engage with its corresponding scape-wheel when the other scape-wheel is released by the pallet belonging to the armature and lever of the other electro-magnet, by which arrangement of the alternately-acting escapements consecutive step-by-step movement of the type-wheel is secured with greater certainty than by the usual single scape-wheels, and by affording time for the discharge of each line and the demagnetization of the escapement electro-magnets in alternate succession the rapidity of transmission may greatly exceed the rate of transmission over one line with a single scape-wheel and escapement electro-magnet.

In Fig. 6 is shown the arrangement when two wedge-pallet scape-wheels are employed, by which arrangement a driving-motor is unnecessary.

To insure equal tension of the adjusting-springs $u^2 u^3$ of the escapement-levers $u$ and $u'$, I attach to the ends of the same wires or cords $u^4$, Fig. 14, prolonged in the direction of said springs until they cross each other and again separate, when the other extremities remote from the ends of these springs are attached, respectively, to the ends of the lever $u^5$, held by a pivoted attachment between the jaws $u^6$ and $u^7$, extending from the sides of the sleeves $u^8$ and $u^9$, through which an adjusting-rod, $u^{10}$, passes, terminating in a screw, $u^{16}$, and clamp-nut $u^{14}$ above the top frame-plate, $j^2$, of the instrument. The lower jaw, $u^7$, is rigidly secured to the rod $u^{10}$, and is arranged to engage with the upper jaw, $u^6$, and sleeve $u^8$ by a projection, $u^{11}$, on the sleeve $u^9$ engaging in a recess in the sleeve $u^8$, in order that the same angular motion given to the sleeve $u^9$ and jaw $u^7$ by the rod $u^{10}$ may be simultaneously imparted to the sleeve $u^8$ and jaw $u^6$. Above the top plate, $j^2$, the arm $u^{12}$ is made to slide on the rod $u^{10}$, rectangular at this point, the socket $u^{15}$ of the arm $u^{12}$ fitting freely over the rectangular portion of the rod $u^{10}$, and an angular motion being imparted thereto by the micrometer-adjusting-screw $u^{13}$, with milled head and clamp-nut, as shown in Fig. 13. It will be understood that the springs $u^2$ and $u^3$ are by this arrangement in effect prolonged and attached, respectively, to the ends of the lever $u^5$, and it follows, when the clamping-nut $u^{14}$, working on the screw $u^{16}$ on the end of the rod $u^{10}$, is released, allowing the lever $u^5$ to turn on its central pivot, that equal tension will be imparted to the springs $u^2$ and $u^3$ by unscrewing the adjusting-screw $u^{13}$. When the springs $u^2$ and $u^3$ have been adjusted to equal tension, the clamping-nut $u^{14}$ is screwed down, raising the rod $u^{10}$ and clamping the lever $u^5$ firmly between the jaws $u^6$ and $u^7$, and after which further adjustment of the springs $u^2$ and $u^3$ is equally imparted through the turning of the key-arm $u^{12}$ by the screw $u^{13}$, which will now produce a combined angular movement of the jaws $u^6$ and $u^7$ and the lever $u^5$. The electro-magnets B and C operate through their armatures the pallet-levers $u$ and $u'$, respectively, and thereby control the movement of the scape-wheels $h$ and $i$ on the sleeve $L^2$ when it is clutched to the type wheel $x'$ and the instrument is used as a receiver. In an independent receiver these scape-wheels and the remaining wheels on the sleeve $L^2$ would be rigidly secured to the shaft X.

The compound electro-magnet consists of two independent electro-magnets, A A', through the helices of which the two main lines are separately connected. The armature $f^3$ of the magnet A is attached to one extremity of the bar $g$, and the armature $f^4$ to the other extremity of this bar $g$, which is pivoted at its center to one end of the strap-coupling $f^5$, connected at its other end to the relay-tongue $e$. The springs $f^7$ and $f^8$ between the bar $g$ and the tongue $e$ may be employed to equalize the vibrations of the armatures $f^3$ and $f^4$. To the tongue $e$ is attached a retractile spring, $f^9$, for adjusting the same. The tongue $e$ is pivoted at one end in electrical connection with the metallic frame-work of the instrument, and at its other end carries a contact-point arranged to close the circuit from one pole of the local battery V in electrical connection with the instrument into the insulated post I', the circuit being completed, as hereinafter described. To the tongue $e$ is attached a strap, $f^6$, which connects with the bell-crank lever $d$ above its lower pivoted end, $c$, in order that the movement of the tongue $e$, when drawn forward by the simultaneous attraction of both armatures $f^3$ and $f^4$ of the electro-magnets A A', will produce an upward movement of the horizontal arm $d$ of the bent lever, passing under the unison locking latch $a$, thereby lifting the pin $b^3$ out of the spiral groove $h^2$, and permitting it to resume its excursion in the unison-spiral before described.

The electro-magnets A and A', when energized by alternate pulsations through the two main lines, alternately attract their armatures $f^3$ and $f^4$, producing only vibrations of the bar $g$ without overcoming the resistance of the retractile spring $f^9$, withholding the tongue $e$; but when both magnets are simultaneously energized both armatures are attracted and the tongue $e$ is drawn into electrical contact with its front stop, I'.

The differential electro-magnet D, the helices of which are wound in reverse directions and in circuit, respectively, with the two main lines, has an armature-lever, $y$, pivoted at one end and adjustable by means of the spring $y^2$. Attached to the lever $y$ is an arm, $y'$, arranged to engage in a tooth of the serrated wheel $m$, secured on the sleeve $L^2$ on the type-wheel shaft $x'$, when the electro-magnet D is rendered inert by simultaneous electrical impulses over the respective lines, and also when both main-line circuits are open. When the electro-magnet D is energized by impulses passing alternately over the lines, the lever $y$ will be rapidly vibrated in harmony with the alternate vibrations of the escapement-levers $u$ and $u'$, releasing the serrated wheel $m$, (which has a tooth for every letter on the type-wheel $A^3$,) and when the pulsations are rapid the electro-magnet D will become charged and its armature will be permanently attracted. The arm $y'$ will therefore not interfere with the movements of the escapements, and will lock the type-wheel at any letter-space when both line-circuits are broken, and also when simultaneous pulsations are sent through both lines.

The method of bringing the type-wheel of a receiving-instrument into unison with the type-wheel of a transmitter when the latter is arrested by the arm R striking the insulated unison-pin $w$ will now be described. When the clutch $o^8$ on the sleeve $L^2$ is so adjusted that the clutch $o^7$ engages with the sleeve $L^2$, and when the unison-space of the type-wheel is opposite the printing hammer and the unison locking-latch $a$ is stopped at the end of its excursion in the spiral groove $h^2$, the type-wheel of the receiver will be in unison with the type-wheel of the transmitter. The circuit-breakers H and H', when the type-wheels are in unison, must stand with the springs P and O on insulations, both line-circuits being broken and the pallet-levers $u$ and $u'$ are both withdrawn; but, however, only one pallet is engaged with one of the scape-wheels. By withdrawing the insulated unison-pin $w$ of the transmitter and permitting the type-wheel and circuit-breaker of the transmitter to revolve twice before dropping the insulated unison-pin $w$, the type-wheel of the transmitter will be arrested at unison position by the contact of the arm R against the insulated unison-pin $w$, and the receiver type-wheel, being rotated by alternate pulsations through magnets B and C, will be arrested by the latch $a$ in unison with that of the transmitter. When impulses are sent simultaneously through both lines to cause the compound relay to close the local circuits through the ratchet-magnet E and the printing-magnet F, as will be hereinafter fully explained, the unison locking-latch $a$ will be displaced by the action of the compound relay A A'. Consequently it will not be possible to lock the type-wheel of a receiver at unison by these devices while the printing is being effected—that is to say, one or more times during each revolution of the type-wheel. If locked at unison and impulses be sent simultaneously over both lines to close the circuit of the local battery V in a receiver to rotate the vibrating segmental paper-carrier, as hereinafter described, the escapement electro-magnets B and C, being in the main-line circuits, respond to these pulsations and attract their armatures, and thereby cause the movement of the type-wheel. Since, however, pulsations simultaneously through both lines render the differential electro-magnet D inert, its lever-arm $y'$ will continue to lock the type-wheel when rotated to unison even after the unison locking-latch $a$ has been displaced by sending simultaneous impulses to cause the rotation of the vibrating segmental paper-carrier.

The various functions of the electro-magnets A, A', and D will more clearly appear when the operation of printing and the electrical circuits are explained.

The commutators K and K', for changing the electrical circuits when a combined instrument is changed from a transmitter to a receiver, and vice versa, consist of circular disks of insulating material secured to a shaft, I, supported in suitable bearings and revolved about forty-five degrees by the switch L, the motion of the switch L being limited by suitable stops, marked, respectively, with the words "Send" and "Receive" in a visible position on the exterior case of the instrument. In the periphery of each of the insulating-disks are bedded metallic blocks, marked, respectively, "Send" and "Receive," and so located that when the switch L is turned to "Send" the metallic block similarly designated on the insulating-disk K' is in electrical contact with each of the circuit springs $g^3$ and $g^4$ in the circuit of the main-line battery W, and the metallic block "Send" in the insulating-disk of the commutator K will be in electrical contact with each of the circuit-springs $d^2$ and $d'$ in the circuit of the local battery V, and the metallic blocks "Receive" in said disks will be out of contact with the springs $g'$ and $g^2$ and $f'$ and $f^2$, as shown in Fig. 1, and, conversely, when the switch L is turned to "Receive," as in Fig. 1ª, the metallic blocks "Send" on the commutators K and K' will be removed from electrical contact with the circuit-springs $g^3$ and $g^4$ and $d^2$ and $d'$, and the block marked "Receive" in the commutator K' will be in electrical contact with the springs $g'$ and $g^2$ in the main-battery circuit, and the block marked "Receive" on the insulating-disk K will be in electrical contact with the springs $f^2$ and $f'$ in the circuit of the local battery V in a receiving-instrument. The circuit-springs $g'$, $g^2$, $g^3$, and $g^4$ and $d'$, $d^2$, $f'$, and $f^2$ must be separately insulated from each other and from the conducting portions of the instrument.

On the shaft I is a crank, $o^9$, supporting a stirrup, $o'$, which loosely embraces the unison-bow-arm $q^2$, allowing space for the free upward motion of this arm $q^2$ when the instrument is organized as a transmitter, and the switch L is turned to "Send," but operative to lift the unison-bow arm $q^2$, thereby removing the insulated unison-pin $w$ out of the range of the arm R when the switch L is turned to "Receive." The crank $o^9$ on the end of the shaft I, Fig. 3, is connected by a vertical link, $o^{10}$, to one end of the lever $u^{24}$, pivoted near its center, and terminating at the other end in a fork, $o^5$, carrying pins $o^6$, moving freely in a groove in the clutch $o^7$. The partial revolutions of the shaft I, caused by turning the switch L from the position "Send" to "Receive," operates through these devices to lower the clutch $o^7$ into engagement with the corresponding clutch, $o^8$, on the upper end of the sleeve $L^2$, bringing into connection with type-wheel and shaft the scape-wheels, unison-spiral, and spacing-wheel $m$ of a receiver. An arm, $o^{11}$, on the shaft I, connected by a rod, $o^{12}$, to an arm, $o^{13}$, on the spindle of the key $m^2$, operates, when the switch L is turned to "Receive," to remove the locking-bar $q^4$ out of range of the rear end of the unison-bow $q^3$, so that the same movement of the shaft I that lifts the unison-bow arm $q^2$ will release the unison-bow $q^3$ when it is desired to operate the combined instrument as a receiver, and the reverse movement of the switch L will again change the instrument to a transmitter. The operative parts of the receiver may be rigidly attached to the type-wheel shaft, dispensing with the sleeve $L^2$, and the escapement, electro-magnets, compound relay, and differential electro-magnet may be energized to operate an independent receiving-instrument.

To prevent an operator from sending to a receiving-instrument before releasing the type-wheel when locked at unison by the unison locking-latch $a$, I employ a releasing-key, $m^2$, by the depression of which and the cam $m^3$ thereon the locking-arm $q^4$ is turned by this cam $m^3$. The partial revolution of the locking-arm $q^4$ causes the insulation $m^4$ to press into electrical contact the springs $m^5$ and $m^6$, insulated at one end from each other and connected in a local branch circuit, and at the same time to remove the angular end of the lock $q^4$ from under the rear end of the unison-bow $q^3$, permitting the lever and character-keys to be operated. To avoid closing this branch local circuit when operating the transmitter, I introduce in the same two other circuit-springs, $m^7$ and $m^8$, which are normally open when the unison-bow arm $q^2$ is raised by any of the key-levers $A^4$; but it is closed automatically by the pressure of an insulation, $q^{12}$, on the under side of the unison-bow arm $q^2$ when all of the character-key lever-arms $A^4$ are released. The ratchet electro-magnet E, as shown in Figs. 7, 8, and 9, in the circuit of the local battery V, is employed to rotate the vibrating segmental paper-carrier, and is preferably located on the plate N', secured to the fixed column $Y^2$, which may extend to the floor $Y^3$ or be supported in a bracket, $Y^5$, firmly bolted to the base-plate $x^6$ of the instrument. The armature of the ratchet electro-magnet E, Fig. 8, is attached to a lever, B', carrying a pawl, C', engaging in the ratchet E', attached to the interior of the vibrating paper-carrier or segmental frame Y. This ratchet E', Fig. 11, may be outside of the vibrating segmental frame Y, and the ratchet electro-magnet E and lever B' may be located within the case of the instrument, the pawl C', dog D', and releasing device $F^2$ being then preferably located as shown.

The paper-carrier may be either a segment of a cylinder or a segmental frame, Y, Fig. 7, with considerable radius, vibrated on a vertical spindle, Y', supported on the fixed post $Y^2$. On this spindle Y' is supported the paper roll $Y^4$, as far as practicable below the paper-segment Y. The larger the radius of the segment the flatter will be the sheet of paper, and the easier and more effective will be the operation of feeding continuous sheets from a roll. The paper-segment Y is moved forward to space between letters impressed by the reciprocating movements of the lever B' and pawl C' when actuated by the ratchet-magnet E, the backward movement of the ratchet E' being resisted by the dog D'.

In order to disengage the pawl C and dog D, Figs. 8 and 11, from the ratchet E' when the paper has been fed so as to present the right-hand margin to the type-wheel $A^3$, I use a tripping device, $F^2$, pivoted on the top of the fixed table N', and consisting of a cross-arm, $n'$, and two projecting pins, $n^2$, extending upward behind the pawl C' and dog D', and an arm, $n^3$, extending downward toward the plate of the table N'. On the back of the paper-segment or segmental frame Y is a fixed pin, $y^4$, which at the last movement of the paper-segment, as the paper printed upon is moving forward to the right-hand margin corresponding with the last notch of the ratchet E', strikes the projecting arm $n^3$, driving it forward the distance of one notch in the ratchet E' of the segmental frame Y. The latch $n^4$, attached to the upper side of the table N', catches in the projecting arm $n^3$ and latches it in position. The pin $n^2$, projecting upward from the cross-arm $n'$, releases the dog D' from the ratchet E', and a pin, $n^2$, projecting upward from the other end of the arm $n'$ is driven against a hook, $n^5$, on the back of the pawl C'. The next attraction of the lever B' by the armature of the ratchet electro-magnet E draws the hook $n^5$ on the pawl C' into engagement with the pin $n^2$ and locks this pawl C' out of contact with the ratchet E', of the vibrating segmental frame Y. The spiral spring $A^5$ on the shaft of the vibrating paper-carrier or segmental frame Y recoils and swings the paper-carrier backward into the position for commencing the printing at the left-hand margin of the paper. A weight hung from a cord passing over a pulley attached to an arm fixed on the post $Y^2$ may be used instead of the spring $A^5$. Just, however, before the segmental paper-carrier Y arrives at this position a pin attached to the vibrating segmental paper-carrier Y disengages the latch $n^4$, and a spring, $n^6$, throws the arm $n'$ back to its normal position, and the springs behind the dog D' and pawl C' cause them to engage with the ratchet E' of the segmental paper-carrier Y.

In order to feed the paper vertically between lines, I attach below the table N' a spiral plane, $P^2$, concentric with the segmental paper-carrier. This plane $P^2$ has a rise equal or proportionate to the distance between the two lines of printing.

Attached to each margin of the segmental paper carrier are bearings which support two shafts, $R^2$ and $R^3$, passing through sleeves $R^6$ and $R^7$, mounted on pivoted trunnions $R^8$, actuated by spiral springs around these trunnions, or in any other suitable manner. On one end of each shaft is a ratchet-wheel, $R^4$, and on the other end a paper-feeding wheel, $R^5$, having a serrated surface, $r^3$, for hugging against and guiding the paper. The paper is pressed between the serrated wheels $R^5$ and the detached roller $R^{11}$ on the opposite side of the paper by suitable springs around the trunnions $R^8$.

In guides attached to the segmental vibrating paper carrier Y are sliding dogs $r^6$, which are forced upward by riding over the plane $P^2$ when the segment recoils turning the ratchets $R^4$, and thereby moving the paper upward the distance between the two printed lines. The stationary dogs $r^4$ hold each ratchet-wheel $R^4$ in position while printing across a page, and the sliding dogs $r^6$ are forced downward into contact with the plane $P^2$ by the springs $v^5$, attached to the arms of sliding pawls $r^6$, ready to catch into the next notch just before the vibrating paper-carrier or segmental frame Y recoils. After the return of the paper to the left-hand margin the same operation may be repeated indefinitely. The paper is normally held out of contact with the type-wheel $A^3$ by an adjustable spring, $j$, secured to the top plate, $j^2$, of the apparatus by a pivoted stud, $j^3$, adjustable by a slotted arm, $j^4$, moving on a stud-pin, $j^5$, on which is a clamping-nut, $j^6$, for adjusting the spring $j$ to its proper position. When the impression-hammer $z$ strikes the paper $j^7$ this spring $j$ is pressed backward under the type-wheel $A^3$, and as the hammer $z$ recoils the spring $j$ moves the paper $j^7$ out of contact with the type-wheel $A^3$, thus regulating the distinctiveness of the impression, preventing blurring, and enabling the printing to be done on flat surfaces.

The circuit-interrupter Q', secured to the table N', consists of the circuit-springs $q$ and $q'$, separated from each other and supported between suitable insulating material by attachment thereto at one end of the springs. The remainder of the springs stand out free without making contact with the insulating-segments, and are bent downward at their free ends, so as to bear on metallic plates bedded in the projecting shelves $q^{15}$ and $q^{16}$, of insulating material. The insulated circuit-springs $p$ and $p'$, attached to the shaft Y', traverse the former springs as the paper-carrier revolves, and, when released, snap downward, interrupting the main-line circuits, and riding by the recoil of the paper-carrier over the insulated shelves until they pass under the bent springs $q$ and $q'$, and close the circuit by contact with the plates $q^{13}$ and $q^{14}$ in electrical contact with the springs $q$ and $q'$. By the forward movement of the paper-carrier the springs $p$ and $p'$ again ride up over the springs $q$ and $q'$, maintaining a closed circuit during the printing operation. The main lines are connected, respectively, through $p$ and $q$ and $p'$ and $q'$, as hereinafter more fully explained.

The operation of the apparatus when printing and the electrical circuits will now be described. The type-wheel $A^3$ of the transmitter is assumed to be arrested at its unison position with the blank unison-space presented to the printing-hammer $z$, the insulated arm R on the shaft X being against the insulated unison-pin $w$, and the commutator-switch L turned to "Send," the metal blocks in the commutators making an electrical connection between the springs $g^3$ and $g^4$ in the circuit of the line-battery W, and also between the springs $d^2$ and $d'$ of the circuit of the local battery V. The stirrup $o'$ is down, allowing the unison-bow arm $q^2$ freedom to operate; but the locking-bar $q^4$, operative by the releasing-key $m^2$, prevents the depression of the rear end of the unison bow $q^3$. The switch L of the receiver, Fig. $1^a$, must be turned to "Receive," and this operation, as previously explained, lifts the unison-bow arm $q^2$ of the receiver, and consequently displaces the insulated unison-pin $w$ out of range of the arm R, while engaging the clutch $o^3$ on the loose sleeve $L^2$ of the type-wheel shaft $x'$ with the clutch $o^7$, attached to this shaft. This movement of the switch L also effects electrical connection at the commutator K' between the springs $g'$ and $g^2$ and the metal block "Receive," displacing the connecting-block between $g^3$ and $g^4$, and similarly closing the electrical connection between the springs $f^2$ and $f'$ and breaking the connection between the springs $d^2$ and $d'$. Pulsations alternately over the main lines will now operate the escapement electro-magnets and mechanism operating therewith, causing a rotation of the type-wheel shaft $x'$ of the receiver until arrested by the unison locking-latch $a$, at which position the type-wheel must be in unison with the type-wheel of the transmitter. At unison the circuit-springs O and P bear on insulations on the circuit-breakers H and H', and the circuit of the main-line battery W at this point is broken in the transmitter, and also the circuits of the local battery V, both in the transmitter and in the receiver, as will hereinafter be explained. The circuit of the main-line battery W, Fig. 1, is from ground by line $l'$ to one electrode of the battery, and the other electrode being in connection by line $l^2$ to an insulated binding-post, $g^6$; thence by line $l^3$ to the spring $g'$; thence by line $l^4$ to the spring $g^3$; thence by spring $g^3$ to the metallic block "Send" to the spring $g^4$; thence by line $l^5$ to the springs O and P, connected with each other, where the circuit can alternately pass through the metallic contacts and hubs of the circuit-breakers H and H' to the springs N and Q, these double-line circuits continuing by lines $l^6$ and $l^7$ to the galvanometer $G^4$; thence separately through the respective coils of the same by the lines $l^8$ and $l^9$ to the springs $q$ and $q'$ of the circuit-interrupter Q'; thence to the springs $p$ and $p'$; thence by lines $l^{10}$ and $l^{11}$ to the circuit-springs $p$ and $p'$ of the receiver, Fig. 1ª; thence by the springs $q$ and $q'$ and the lines $l^8$ and $l^9$ to the intersection of lines $l^{14}$ and $l^{10}$, beyond which the lines $l^6$ $l^7$ $l^5$, available in transmitting, are open in the receiver at the block marked "Send" of the commutator K'. From this intersection with lines $l^{14}$ and $l^{10}$ one line, $l^{10}$, passes through the helices of the compound relay A; thence by line $l^{11}$ to the escapement electro-magnet C, and by line $l^{12}$ in one direction—say to the right—around the cores of one division of the differential electro-magnet D; thence by line $l^{13}$ to the spring $g^2$ to metallic block "Receive;" thence to the spring $g'$; thence by line $l^3$ to the insulated binding-post $g^6$ and by line $l^{18}$ to ground, the other main line, $l^{14}$, passing through the helices of the other branch of the compound relay A', and by line $l^{15}$ to the helices of the escapement electro-magnet B; thence by line $l^{16}$ to the left-hand through the helices of the other branch of the differential electro-magnet D; thence by line $l^{17}$, connecting with the former main line $l^{13}$. In a series of instruments these lines $l^{17}$ and $l^{13}$ would be continued separately through separate commutators to successive instruments. The relay G is introduced in the transmitter in the circuit of the local battery V, to connect and disconnect the branch line $l^{19}$ with the lines $l^{20}$ and $l^{21}$ simultaneously. These lines $l^{20}$ and $l^{21}$ connect with lines $l^7$ and $l^6$ before passing through the galvanometer $G^4$, line $l^{19}$ connecting with the insulated tongue $t^2$ of the relay G, and lines $l^{20}$ and $l^{21}$ connecting with the front insulated contacts $t$ and $t'$ of said relay. One pole of the local battery V is connected by line $l^{22}$ to the binding-post $w^5$, in metallic connection with the indicator-plate T, and therefore is in connection with the metallic portions of the instrument. When the arm R is in contact with the insulated unison-pin $w$, the circuit is thereby interrupted between the indicator-plate and the arm R; but when a character-key is depressed, projecting a metallic pin, $x^5$, in the path of the arm R, and this arm is thereby arrested, the circuit continues by arm R through its hub $s'$, insulated spring $s$, to the binding-post $s^2$; thence by line $l^{23}$ to the helix of the relay G; thence by line $l^{24}$ to the spring $d^2$; thence to the metallic block "Send," and thence to the spring $d'$; thence by line $l^{25}$ to electro magnet E, by line $l^{26}$ to magnet F, by line $l^{27}$ to the other pole of the battery V. A branch local circuit of the battery V, normally open at the key M, starts from the battery-connection at the binding-post $w^5$ with the indicator T, and is available for rotating the paper-carrier when the type-wheel is at unison and the arm R is on the insulated unison-pin $w$, this line $l^{23}$ from the indicator-plate T to the relay G being then inoperative. This branch circuit starts from the binding-post $w^5$ on the indicator-plate T, passing by line $l^{28}$ to the trunnion and lever of the key M, and from its anvil by line $l^{29}$ connects with line $l^{23}$ at the relay G, by the line $l^{24}$, previously described, to the spring $d^2$ at the commutator K. The key M will therefore close or break this branch circuit to energize the relay G, and also the ratchet-magnet E and printing-magnet F, when the printing-circuit is broken at the insulated unison-pin $w$ and arm R. A secondary branch local circuit continues from the trunnions of the key M by line $l^{33}$ to the spring $m^7$, and closes into the spring $m^8$; thence by line $l^{34}$ into the spring $m^5$, and by spring $m^6$, when in contact with line $l^{35}$, to the anvil of the key M. Springs $m^7$ and $m^8$ make contact when the unison-bow arm $q^2$ is allowed to drop, but are open during the operation of printing, the unison-bow arm $q^2$ being then elevated by the depression of any character-lever A¹. The springs $m^5$ and $m^6$ are intended to make contact only while the releasing-key $m^2$ is depressed in order to energize the relay G before depressing a character-key. The circuit of the local battery V in the receiver, Fig. 1ª, starts from one electrode by line $l^{22}$ to binding-post $w^5$ on the indicator-plate T, and the lines just described in the transmitter, Fig. 1, are interrupted at the indicator-plate, for the reason that the character-keys and metallic pins are not operated in a receiving-instrument, and the line $l^{24}$ is also broken between the springs $d^2$ and $d'$ through the intervention of the insulating-disk K; but the indicator-plate T, and also the tongue $e$, being in metallic contact, the circuit will pass from the binding-post $w^5$ through the instrument, which may be indicated by a line, $l^{30}$, to the tongue $e$, which, by the action of the compound relay A A', closes against the contact on the insulated post I', and by line $l^{31}$ to the spring $f^2$, metallic block "Receive," to the spring $f'$, line $l^{32}$ to line $l^{25}$, to the ratchet-magnet E, by line $l^{26}$ to the printing-magnet F, and by line $l^{27}$ to the other electrode of the battery V, thus completing the circuit. The type-wheels of the transmitter and receiver being at unison, and the left-hand margin of the paper being presented to the same on both instruments, by pressing the releasing-key $m^2$, the secondary local branch circuit $l^{33}$, $l^{34}$, and $l^{35}$ will be completed through the springs $m^5$ and $m^6$, as described, and the relay G and electro-magnets E and F of the transmitter will be energized, drawing back the pawl C', and causing the hammer $z$ to impress the paper against the unison-blank on the type-wheel, while the electro-magnet G will act to close the line-battery circuit simultaneously through both main lines to the receiver, wherein they pass separately, in the manner previously described, through the electro-magnets A, A', B, C, and D, and to ground, as described, when the switch L is turned to "Receive," as shown in Fig. 1ª. The differential electro-magnet D will be neutralized, and the arm $y'$ on its lever $y$, withdrawn by its spring $y^2$, will engage in the serrated wheel $m$, and thus lock the type-wheel $A^3$ of the receiver, while the compound relay A A' will be energized, causing the tongue $e$ to be attracted, releasing the unison locking-latch $a$ and closing the local circuit at the contact I', which will energize the electro-magnets E and F. The ratchet-magnet E will draw back the pawl C' to engage in a tooth of the ratchet E', and the printing electro-magnet F will cause the printing-hammer $z$ to impress the paper against a unison-space on the type-wheel of the receiver. Proceeding now to depress a character button and key on the transmitter and releasing the key $m^2$, the unison-bow arm $q^2$ is raised, breaking the secondary local circuit at the springs $m^7$ and $m^8$, whereupon the tongue $t^2$ of the relay G will be withdrawn by its spring $g^{10}$, and all the actuating-circuits will be broken. The printing-hammers of both instruments will fall back, and the paper segmental frame will move forward one notch of the ratchet E' by the recoil of the spring $A^{11}$, while the type-wheel of the receiver will remain stationary, being locked by the arm $y'$ and serrated wheel $m$, until a single line pulsation occurs; but the unison locking bow arm $q^2$ having been raised the circuit-breakers H and H' will, by revolving, cause a succession of makes and breaks of the line-battery circuit in both lines, alternately, and equal in number in the aggregate to the number of spaces between the pins on the indicator-plate T traversed by the arm R before it is arrested by the metallic pin $x^7$ on the lever depressed, and the type-wheel of the transmitter will consequently present to the paper the character indicated by the depressed key. During the partial revolution of the circuit-breakers H and H' the compound relay A A' in the receiver will only vibrate their armatures without moving the tongue $e$. The escapement electro-magnets B and C will alternately vibrate the escapement-levers $u$ and $u'$, and thereby permit a simultaneous advance of the type-wheel, so as to present a corresponding letter, while the magnet D, vibrating or retaining its armature by rapid pulsations over both lines, will release and not interrupt the movement of the type-wheel of the receiver. The primary local circuit of the battery V in the transmitter being completed by contact of the arm R with the metallic pin $x^7$, the relay electro-magnet G and electro-magnets E and F will be energized thereby, and the character presented to the paper will be impressed thereon by the printing-hammer $z$, the pawl C' will be drawn back to engage with another tooth of the ratchet E', the ratchet being in the meanwhile held by the dog D', and at the same instant the line-battery circuit will be closed simultaneously into both lines through the receiver, locking the serrated wheel $m$ and the type-wheel through the action of the differential magnet D and arm $y'$, and closing the local-battery circuit by the compound relay A A' at the contact-post I', through the electro-magnets E and F, resulting in the same movement of the pawl C' and printing-hammer $z$ as described for the transmitter. By depressing another character-key before the previous one is released the unison-bow $q^3$ is kept down and the insulated unison-pin $w$ elevated, and cannot arrest the arm R, which revolves rapidly from contact with the pin last released until it strikes the next pin depressed; but as soon as it has been released by any pin the local-battery circuit is thereby broken, resulting in breaking simultaneously the local circuit in the receiver, and permitting the printing-hammer to fall back and the paper on both instruments to feed the space between two characters of the printing. When the arm R strikes another pin, the character indicated is printed in the same manner, and the operation may be repeated until the impression has reached the right-hand margin of the paper, when by the action of the automatic releasing device $F^2$, as aforesaid, the pawl C' and dog D' are automatically released from connection with the ratchet E' on both instruments. The arms carrying the pawls $r^6$ have been meanwhile forced downward by the springs $v^5$, keeping the rollers on these arms in contact with the descending plane $P^2$, so that the pawls $r^6$ become engaged in another tooth of the ratchet-wheels $R^4$, and the segmental frame Y, having been automatically released, recoils by the action of its spring $A^5$ (or it may be by a weight) until arrested by a stop in such position as to present again the left-hand margin of the paper to the type-wheel, while the sliding arms carrying the pawls $r^6$ are gradually forced upward during the return movement of the segmental frame, revolving the ratchet-wheels $R^4$ and feed-wheels $R^5$, which press the paper against the rollers $R^{11}$, feeding it upward through the guides on the segmental frame in a vertical direction contiguous to the type-wheel a distance equal to the space between two lines of the printing. The dogs $r^4$ retain the ratchets and paper in position until a similar movement is repeated. The pawl C' and the dog D' again automatically resume their engagement with the ratchet E'. The circuit-springs $p$ and $p'$ in the line-circuit have maintained electrical contact with the springs $q$ and $q'$ during the operation of printing; but during the return movement of the segmental paper-carrier Y the springs $p$ and $p'$ have traversed insulating-surfaces, interrupting the line-battery circuits during their retrograde movement. An indicating magnetic pointer, $G^5$, pivoted near a double-line coil, as in the galvanometer $G^4$, and excited by currents of similar polarity in both lines connected through the respective coils, will be made to vibrate rapidly in one direction from its magnetic meridian by the rapid impulses through the coils when printing or rotating the paper, until it strikes a fixed pin, limiting its throw to a part of or nearly an entire revolution, and when the circuits are interrupted by the insulations on the interrupters Q' during the recoil of the segmental paper-carrier Y, this indicating-pointer $G^5$ will swing back until it is arrested by the fixed stop or a bell, $G^6$, and thus visibly or audibly indicating to the operator when the paper on the transmitter is returning to the left-hand margin, whereupon any variation in the movement of the paper in the respective instruments may be at once detected and corrected.

To effect unison of the type-wheels it is only necessary to depress the unison-key $m'$ after the character-key last operated upon to elevate the unison-bow arm $q^2$ and insulated unison-pin $w$, without depressing another character-key and pin $x^7$, and to allow the type-wheel of the transmitter to make two revolutions and then release this key $m'$, which permits the unison-bow arm $q^2$ to drop the insulated unison-pin $w$ to arrest the type-wheel. Pulsations over the line-circuit will revolve the receiver type-wheel until the unison locking-latch $a$ reaches its limit in the spiral groove $h^2$, and thus the type-wheels will be in unison. After effecting unison of the type-wheels, printing may be again resumed, as hereinbefore explained, by first pressing the releasing-key $m^2$, to insure the release of the unison locking-latch $a$ before sending alternate pulsations to rotate the type-wheel of the receiver.

To bring the paper to the left-hand margin before printing, or to space between paragraphs, the type-wheels are first arrested at unison, when the primary local circuit of the transmitter is broken at the indicator-plate T, and the key M in the branch local circuit of the transmitter is then rapidly operated, resulting in rapid simultaneous pulsations over both main-line circuits, and likewise pulsations in the local circuit of both instruments, locking the type-wheel of the receiver at unison by the magnet D, and rotating the segmental paper-carrier by the electro-magnet E, while the printing-hammer $z$, actuated by the magnet F, impinges against the paper without producing impressions.

The receiver may be operated by two ordinary relays and an additional local battery, in a well-known manner, by passing the main lines $l^5$ and $l^6$, Fig. 1$^a$, through the coils of the relays, respectively, and to ground, without passing through the instrument, and connecting line $l^{13}$ with one pole of the additional battery, and disconnecting lines $l^{10}$ and $l^{14}$ from lines $l^9$ and $l^7$, and then connecting them to the front contacts of the relays and thence to the other pole of said battery by the tongues of the relays and two separate conductors. The electro-magnets A, A', B, C, and D will then be energized by the additional local battery in response to pulsations over the main lines through the two relays.

Having thus described the nature and objects of my invention, what I claim as new, and desire to secure by Letters Patent, is—

1. The combination, substantially as hereinbefore set forth, of a battery, two electro-magnets in the circuit of said battery, the armature-levers of said electro-magnets carrying, respectively, anchor-pallets, the pallets on each lever controlling one of two scape-wheels secured to a shaft or sleeve thereon, the teeth in one scape-wheel alternating with the teeth in the other scape-wheel, and the armature-levers operated alternately and successively by pulsations over two conductors in the circuit of said battery, substantially as and for the purposes described.

2. The combination, substantially as hereinbefore set forth, of a battery, two electro-magnets in the circuit of said battery, the armature-levers of said electro-magnets carrying, respectively, double-wedge pallets, and two scape-wheels secured to the type-wheel shaft, the teeth of one scape-wheel alternating with the teeth of the other scape-wheel, and operating alternately and successively by pulsations over two conductors in the circuit of said battery, substantially as and for the purposes described.

3. The combination, substantially as hereinbefore set forth, of two scape-wheels rigidly secured to the type-wheel shaft, or a sleeve thereon, double pallets actuated by separate line-wires, and two escapement electro-magnets, the escapement electro-magnets being energized and demagnetized alternately and successively by pulsations over the respective conductors, and the teeth in the respective scape-wheels alternating, and so arranged as to cause the type-wheel to move continuously by intermittent steps the space of one character at each make and the space of one character at each break of the circuit in the respective lines, substantially as and for the purposes set forth.

4. In a printing-telegraph, two escapement electro-magnets with their armature-levers, pallets, and adjusting-springs, and a centrally-pivoted lever, to the ends of which the prolongations of said springs are secured, said lever being pivoted between two clamping-jaws, one of said jaws being rigidly attached to an adjusting-rod, and the other jaw being attached to a sleeve loose on said rod and engaging with the fixed jaw, a clamping-screw and key for said rod, and an adjusting-screw on said key, by the combined operation of which equal adjustment of the springs and levers is secured, substantially as described.

5. A compound or duplex relay provided with compound armatures secured to a centrally-pivoted lever linked to a relay-tongue, the relay-tongue carrying at one end a contact-point and an insulated post in close proximity thereto, said compound relay so organized as to vibrate its armatures without actuating the relay-tongue when energized alternately by alternate pulsations over the respective lines, and actuating both armatures and tongue when pulsations over the respective lines energize the electro-magnets simultaneously, substantially as described.

6. In a combined transmitting and receiving instrument, the combination, with a circuit-switch and its shaft, of commutators provided with circuit-springs, an arm on said shaft connected to a pivoted lever engaging in a movable clutch on the type-wheel shaft, an arm on the commutator-shaft supporting a stirrup around the unison-bow arm, and an arm on said shaft connected with a locking device for the unison-bow, all operating by the movement of the switch in one direction to change the electrical circuits, to engage the sleeve carrying the scape-wheels, unison-spiral, and spacing-wheels, to release the unison bow and pin, and to effect the change from a transmitter to a receiver, and vice versa, substantially as and for the purposes described.

7. In a printing-telegraph, a vibrating segmental frame for holding the paper on which impressions are to be made, and a vertically-pivoted shaft, to which said vibrating segmental frame is attached, substantially as described.

8. As an improvement in printing-telegraphs, a segment of a cylinder or segmental frame secured to a vertical shaft pivoted to a fixed support, said segmental frame holding the paper on which impressions are to be made, and vibrating in a circular arc contiguous to the type-wheel, in combination with a helicoidal plane concentric with said segmental frame or cylindrical segment and secured to a fixed support, sliding pawls actuated by said plane and engaging in ratchet-wheels, and operating feed-wheels secured to the shafts of said ratchet-wheels for pressing the paper against rollers attached to said segmental frame, the whole operating by the recoil movement of the segmental frame to feed the paper vertically a space between two lines, substantially as described.

9. The combination, in a printing-telegraph, of a vibrating segmental frame, the ratchet and printing magnets, the magnets supported on a table secured to a fixed support, and the cylindrical segment swinging on a spindle supported thereby, a plane for feeding the paper vertically secured to said support, and ratchets, feed-rollers, dogs, and clutches secured to the vibrating cylindrical segment, for feeding the paper horizontally for spacing letters, and vertically for spacing between lines, substantially as described.

10. In a printing-telegraph receiver, circuit-springs, and interrupting insulations secured to a support contiguous to the movable paper-carrier, and circuit-springs secured to said paper-carrier, the latter springs arranged to maintain electrical contact with the former springs and insulations, or vice versa, during the forward movement of said carrier, and to traverse insulations during the reverse movement, and a battery-circuit in which said springs and insulations are included, a galvanometer in the same circuit as the transmitter to signal the return movement of said paper-carrier, substantially as described.

11. The combination, in a printing-telegraph, of a movable rack and a releasing device secured to a fixed support, consisting of the pivoted T-arm, with pins acting to engage and release a pawl and dog from said rack, a pin engaging in a latch to retain said T-arm when moved forward by a stop secured to the paper-carriage, and a spring to return said T-arm when the latch is released by a stop on said paper-carrier, substantially as and for the purposes described.

12. In a printing-telegraph, an adjustable spring secured to the top plate of the instrument by a pivoted stud adjustable through a slotted arm movable on a stud-pin on which is a clamping-nut, and all arranged as described, for adjusting said spring to its proper position, for the purposes set forth.

13. The combination, in a printing-telegraph, of a printing electro-magnet, with its armature and a hammer actuated thereby, a table in the interior of a vibrating segmental frame, and a vibrating segmental frame secured to a shaft held in bearings attached to a fixed support, substantially as and for the purposes described.

14. The combination, in a printing-telegraph, of a type-wheel and means for rotating the same, a centrally-pivoted vibrating segmental frame for supporting the paper adjacent to the periphery of said type-wheel, a battery, and an electro-magnet in the circuit of said battery, with means, substantially such as described, actuated thereby for feeding the paper by a vibratory step-by-step movement to space between letters in a horizontal line, an incline plane, and means, substantially such as described, actuated thereby during the reciprocating movement of said vibrating segmental frame to feed the paper vertically the space between lines, and an electro-magnet in said battery-circuit, with means, substantially such as described, for making impressions.

15. The combination, in an adjustable centrifugal governor, of a cross-arm loose on its shaft, supporting weighted arms embraced by a coiled spring and pivoted at their upper ends, said arms bearing at their lower weighted ends by centrifugal force against the interior of a circular rim, the cross-arms carrying adjustable springs to regulate the friction between the springs and the conical frictional hub secured to said shaft, and the adjusting-rod carrying a fork engaging in a grooved hub, attached to and supporting the cross-arm, to regulate the frictional bearing of the springs by the vertical movement of said cross-arm, substantially as and for the purposes set forth.

16. The combination, in a printing-telegraph, of an indicator-shaft carrying a revolving arm and contact-spring, a series of metallic pins so arranged as to arrest said arm at intervals corresponding with the characters on the type-wheel, arms for operating said metallic pins, a shaft with a type-wheel thereon, a centrifugal adjustable governor actuated from the type-wheel shaft, and printing and ratchet magnets in a local circuit closed by contact between said arms and pins, substantially as and for the purposes set forth.

17. The combination, in a printing-telegraph, of a battery, main-line circuit and interrupters included therein attached to the vibrating segmental frame of the receiver, means, substantially such as described, for maintaining and interrupting said circuit, operated by the vibrating segmental frame to maintain a closed circuit during the operation of printing, and to automatically break the circuit by the recoil movement of said vibrating segmental paper-carrier, indicating through a galvanometer in said circuit at the transmitter when the circuit is interrupted by the recoil movement of said vibrating segmental paper-carrier, whereby the vibrating segmental paper-carrier of the transmitter may be brought into unison with that of the receiver, and similar spacing and paragraphing maintained on both instruments, substantially as described.

18. The combination, with the indicator-plate seated in a recessed step secured to the bed-plate, of a detachable shaft bearing in the indicator-plate and upon a secondary step, said detachable shaft carrying a circuit-closing arm below said indicator-plate, the whole arranged for permitting the removal of the mechanical and electro-magnetic devices without disturbing said indicator-plate or lever-arms, substantially as described.

19. The combination, with the type-wheels of a printing-telegraph transmitter and receiver, of a vibrating segmental frame secured to a pivoted shaft, with means, such as described, for holding a sheet of paper in the interior of said segmental frame contiguous to the type-wheel, and an electro-magnet secured to a fixed support, with its armature, lever, pawl, dog, and spring, a ratchet secured to the segmental frame, a weight hung from and soliciting the segmental frame and ratchets, pawls, wheels, and rollers, the arm carrying the pawls riding over an incline plane and moved thereon by the force applied to the segmental frame, substantially as and for the purposes set forth.

20. The combination, with the indicator or type-wheel shaft of a combined instrument, of a scape wheel or wheels of a printing-telegraph receiver carried on a sleeve on said shaft and controlled by pallets vibrated by an electro magnet or magnets, whereby the scape-wheels and type-wheel are rotated in response to intermittent electrical pulsations from a transmitter, said scape-wheels being secured to a sleeve attachable to and detachable from said shaft by means of a clutch and actuated by the same driving mechanism that moves the type-wheel when used as a transmitter, and means, such as described, for changing the transmitter to a receiver, and vice versa.

21. The combination, in a printing-telegraph, of a unison-spiral on a loose sleeve on the type-wheel shaft, a unison-latch to arrest said spiral, and a compound relay in two separate lines of a battery-circuit, said relay operating, by means such as described, to release the unison-latch, substantially as and for the purposes set forth.

22. The combination, in a printing-telegraph, of a unison-spiral and letter-spacing wheel on a sleeve on the type-wheel shaft, and means, such as described, for securing said sleeve to said shaft, a unison-latch to arrest said spiral, a compound relay in two separate lines of a battery-circuit, said relay operating, by means such as described, to release the unison-latch, and a differential magnet in both lines, operating, by means such as described, to arrest the type-wheels, substantially as and for the purposes set forth.

23. As an improvement in printing-telegraphs, a differential relay in a double-line circuit, with a lever-arm and spring for holding the type-wheel during the printing, or while rotating the paper-carrier, when the unison-latch is released by currents sent simultaneously over both lines, said differential relay being rendered inert by double-line pulsations, substantially as and for the purposes set forth.

24. The combination, substantially as hereinbefore set forth, of a battery and two telegraphic main lines, two escapement electro-magnets, a compound or duplex relay for closing the paper-feeding and printing circuits, and a differential magnet included in the circuit of the main lines, or in a local circuit controlled by two neutral relays in the main lines, to lock the type-wheel of a receiver, automatic circuit-interrupters in the main lines, local batteries and circuits for both transmitter and receiver, the local circuit through the transmitter energizing the impression and paper-feeding magnets, and a relay which closes simultaneously the main-line circuits actuating the compound or duplex relay and differential magnet of the receiver, and closing, by means of the compound and duplex relay, the local circuit of the receiver through the impression and paper-feeding magnets.

25. The combination, substantially as hereinbefore set forth, of a battery and two telegraphic main lines, two escapement electro-magnets, a compound or duplex relay to close the paper-feeding and printing circuits, and a differential magnet included in the circuit of said main lines, or in a local circuit controlled by two neutral relays in the main lines, to lock the type-wheel of a receiver, and local batteries and circuits for both transmitter and receiver, the local circuit through the transmitter energizing the impression and paper-feeding magnets, and a relay which closes simultaneously the main-line circuits actuating the compound or duplex relay and differential magnet of the receiver, and closing, by means of the compound of duplex relay, the local circuit of the receiver through the impression and paper-feeding magnets, a key in the branch to the local circuit of transmitter for closing the main-line circuits simultaneously, thereby actuating the paper-feeding devices without making impressions, substantially as and for the purposes described.

26. The combination, substantially as hereinbefore set forth, of a battery and two telegraphic main lines, two escapement-magnets, a compound or duplex relay to close the paper-feeding and printing circuits of a receiver and for releasing the unison-latch, a differential magnet included in the circuit of the main lines, or in a local circuit controlled by two neutral relays in the main lines, to lock the type-wheel of the receiver, automatic circuit-interrupters in the main lines, local batteries and circuits for both transmitter and receiver, the local battery and circuit through the transmitter energizing the impression and paper-feeding magnets, and a relay which closes simultaneously the main-line circuits actuating the compound or duplex relay and differential magnet of the receiver, and by means of the compound or duplex relay closing the local circuit of the receiver through the impression and paper-feeding magnets, a key in the branch to the local circuit of the transmitter for closing the main-line circuits simultaneously to actuate the paper-feeding devices without making impressions, and a unison-key to release the circuit-breaker, thereby causing alternate pulsations to be sent over the respective lines to bring the instruments to unison.

27. The combination, substantially as hereinbefore set forth, of a battery and two telegraphic main lines, two escapement-magnets, a compound or duplex relay to close the paper-feeding and printing circuits of a receiver and for releasing the unison-latch, a differential magnet included in the circuit of the main lines, or in a local circuit controlled by two neutral relays in the main lines, to lock the type-wheel of a receiver, automatic circuit-breakers in the main lines, local batteries and circuits for both transmitter and receiver, the local battery and circuit through the transmitter energizing the impression and paper-feeding magnets, and a relay which closes simultaneously the main-line circuits actuating the compound or duplex relay and differential magnet of the receiver, and by means of the compound or duplex relay closing the local circuit of the receiver through the impression and paper-feeding magnets, a key in the branch to the local circuit of the transmitter for closing the main-line circuits simultaneously to actuate the paper-feeding devices without making impressions, a unison-key to release the circuit-breaker, thereby causing alternate pulsations to be sent over the respective lines to bring the instruments to unison, and a releasing-key for unlocking the unison-bow of the transmitter and for closing the branch local circuit in the transmitter through a relay operating to send simultaneous pulsations to the compound or duplex relay of the receiver to disengage the unison-latch, substantially as and for the purposes described.

28. The combination, substantially as hereinbefore set forth, of a battery and two telegraphic main lines, two escapement-magnets, a compound or duplex relay, a differential magnet included in the circuit of the main lines, or in a local circuit controlled by two neutral relays in the main lines, local batteries and circuits for both the transmitter and receiver, the local battery and circuit through the transmitter energizing the impression and paper-feeding magnets, and a relay which closes simultaneously the main-line circuits actuating the compound or duplex relay and differential magnet of the receiver, and by means of the compound or duplex relay closing the local circuit of the receiver through the impression and paper-feeding magnets, a key in the branch to the local circuit of the transmitter for closing the main-line circuits simultaneously to actuate the paper-feeding devices without making impressions, a unison-key to release the circuit-breaker, thereby causing alternate pulsations to be sent over the respective lines to bring the instruments to unison, a releasing-key for unlocking the unison-bow of the transmitter and for closing the branch local circuit in the transmitter through a relay operating to send simultaneous pulsations to the compound or duplex relay of the receiver to disengage the unison-latch, circuit-springs in said branch circuit automatically breaking the same by the release of the unison-bow before motion is imparted to the main-line-circuit breaker, and means, such as described, for changing the circuits in a transmitter to the circuits in a receiver, and vice versa.

JACOB H. LINVILLE.

Witnesses:
LOUIS H. KUEBLER,
WILLIAM C. MAYNE.